United States Patent [19]

Nicco et al.

[11] 4,105,842
[45] Aug. 8, 1978

[54] HIGH PRESSURE ETHYLENE POLYMERIZATION USING CATALYSTS OF THE ZIEGLER TYPE

[75] Inventors: Adrien Nicco; Jean-Pierre Machon, both of Bethune, France

[73] Assignee: Societe Chimique des Charbonnages-CdF Chimie, Mazingarbe, France

[21] Appl. No.: 780,452

[22] Filed: Mar. 23, 1977

[30] Foreign Application Priority Data

Mar. 31, 1976 [FR] France .................................. 76 09353

[51] Int. Cl.$^2$ ........................... C08F 2/02; C08F 4/34; C08F 4/64; C08F 10/02
[52] U.S. Cl. ........................................ 526/65; 526/66; 526/67; 526/84; 526/352; 526/352.2; 528/488; 528/501
[58] Field of Search ....................... 526/65, 66, 67, 84, 526/352, 352.2; 528/488, 501

[56] References Cited

U.S. PATENT DOCUMENTS 3,758,446 9/1973 Coughlin et al. ...................... 526/67
4,014,859 3/1977 Cooper et al. ......................... 526/352

FOREIGN PATENT DOCUMENTS 462,833 7/1975 U.S.S.R. .................................... 526/65

Primary Examiner—Alan Holler
Attorney, Agent, or Firm—Finnegan, Henderson, Farabow & Garrett

[57] ABSTRACT

Ethylene is polymerized, in the presence of hydrogen, at a temperature of 180° to 340° C and a pressure of 200 2,500 bars with a Ziegler catalyst in a stirred reactor having at least one first reaction zone and at least one second reaction zone. The reaction mixture is fed to a separator at a pressure of 80 to 400 bars. The improvement results from partially liquifying at least a part of the gas coming from the separator at a temperature of −50° to +20° C, releasing the pressure to a value of 10 to 60 bars, separating the partially liquified gas into a gas phase and a liquid phase, and recycling the gas phase to the second reaction zone and the liquid phase to the first reaction zone. The resulting polymer has a low melt index, a high polydispersity index, and superior physical properties compared to polymers prepared by conventional processes.

12 Claims, 1 Drawing Figure

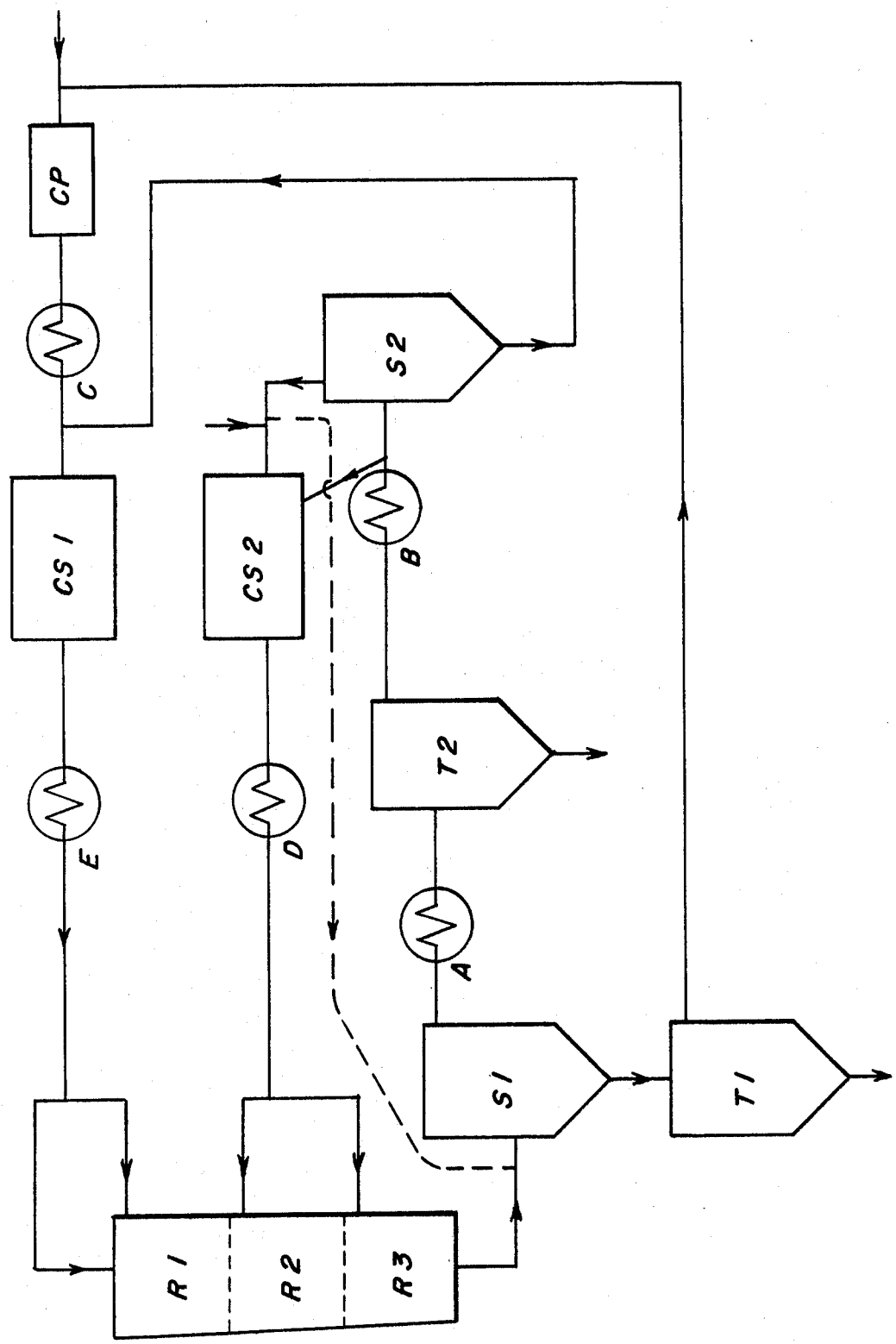

HIGH PRESSURE ETHYLENE POLYMERIZATION USING CATALYSTS OF THE ZIEGLER TYPE

BACKGROUND OF THE INVENTION

The present invention relates to an improved process for the ionic polymerisation of ethylene under high pressure and more particularly to a high temperature polymerisation process which makes it possible to manufacture high-density polyethylene having a melt index greater than 0.1 and a polydispersity index greater than that obtained by the known processes. As used in the present application, polydispersity index denotes a number which measures the molecular weight distribution and is equal to the ratio (Mw/Mn) of the weight-average molecular weight to the number-average molecular weight, these weights being measured by gel permeation chromatography.

It is well-known to polymerise ethylene under high pressure at a high temperature by an ionic mechanism, using a catalyst system of the Ziegler type which comprises, firstly, a halogen compound of a transition metal such as titanium trichloride and, secondly, an organo-aluminum activator such as a trialkyl-aluminium or alkyl-siloxalane. However, the manufacture, by this prior process, of high-density polyethylene having a melt index greater than 0.1 (measured according to Standard Specification ASTM D 1238-73) and having a high polydispersity index, is particularly difficult. In fact, this prior process much more easily gives high-density polyethylene of melt index greater than 1 and of polydispersity index of less than 6, which is very suitable for processing by injection-moulding. In particular, adapting only the temperature and pressure conditions is not sufficient to change the index of (Mw/Mn) in the desired sense; the use of a reactor comprising several reaction zones which operate at different temperatures, or the arrangement of several reactors in series or in parallel permits only an insufficient broadening of the molecular weight distribution of the resin produced.

Similarly, the process of polymerisation in the presence of hydrogen, described in British Pat. No. 1,419,012, which consists in not introducing the gas phase from the separator into the first zone of the reactor, is of limited efficiency because the feed rate of ethylene of low hydrogen content cannot exceed about 20% of the total feed rate.

SUMMARY OF THE INVENTION

The process according to the present invention provides an entirely satisfactory solution to the problem raised. It comprises polymerising the ethylene, in the presence of hydrogen acting as a transfer agent, at a temperature of 180° to 340° C under a pressure of 200 to 2,500 bars by means of a catalyst system of the Ziegler type in at least one stirred reactor comprising at least one first reaction zone and at least one second reaction zone, releasing the pressure and passing the reaction mixture to a first separator under a pressure of 80 to 400 bars, passing the liquid phase coming from the first separator to a first funnel under a pressure of 1 to 15 bars, recovering the polymer which constitutes the liquid phase coming from the first funnel, recompressing the gas phase coming from the first funnel and passing it to the first reaction zone, passing the gas phase coming from the first separator to a second funnel via a first condenser, partially liquefying, at a temperature of $-50°$ to $+20°$ C, at least a part of the gas phase coming from the second funnel by means of a second condenser, releasing the pressure to a value of 10 to 60 bars and then separating this flow in a second separator, recompressing the gas phase coming from the second separator and passing it to the second reaction zone, and recompressing, and passing to the first reaction zone, the liquid phase coming from the second separator, mixed with the gas phase coming from the first funnel.

In the process according to the invention, the second funnel makes it possible to separate polymers of low molecular weight, fats, oils and catalyst components; the partial liquefaction carried out as the material leaves the second funnel provides a liquid phase of low hydrogen content which is directed to the first reaction zone or zones, and a gas phase rich in hydrogen which is directed to the second reaction zone or zones.

According to an advantageous alternative embodiment of the invention, the ethylene is polymerised in the presence of from 1 to 20% by weight of an inert hydrocarbon such as propane or butane, the function of which is to reduce the hydrogen concentration in the liquid fraction obtained after partial liquefaction at the second condenser; depending on the pressure and temperature conditions, the concentration of inert hydrocarbon in this liquid fraction will be equal to or greater than its initial concentration and thus the content of inert hydrocarbon will advantageously be highest in the first reaction zone, where the danger of demixing is greater.

According to another advantageous alternative embodiment of the invention, hydrogen can be injected into the gas phase coming from the second condenser, before its recompression; thus, beyond regulating the temperature by means of the same condenser, there is made available a second means of adjusting the hydrogen concentration in the second reaction zone, and, consequently, adjusting the quality of the resin produced. The process of the invention is, naturally, also applicable to the copolymerisation of ethylene with α-olefines such as propene, 1-butene or 1-hexene, or with non-conjugated diolefines.

BRIEF DESCRIPTION OF THE DRAWING

The drawing is a flow diagram of the process of the present invention.

DESCRIPTION OF THE PREFERRED EMBODIMENTS

The invention will be better understood on considering the single figure, which represents the simplified polymerisation diagram of the process according to the invention. In this figure, $R_2$ and $R_3$ form the second reaction zones of the reactor, which operate at a higher temperature than the first reaction zone $R_1$; for the purpose of simplification, the fresh ethylene feeding circuits of the zones have not been represented. $S_1$ is the separator located downstream from an expansion valve which is not shown, from which the liquid phase is fed to the funnel $T_1$, where the polymer is again degassed. The gas phase coming from $T_1$ is recompressed in CP together with a make-up of fresh ethylene; after passing through the condenser C, it is recompressed at $CS_1$ and, after passing through the condenser E, it is fed to $R_1$.

The gas phase coming from $S_1$, after having passed through the condenser A, arrives at the funnel $T_2$ where the low polymers, greases, oils and catalyst components are separated off. The greater part, preferably the whole, of this gas phase is then partially liquefied in the condenser B whilst any residual part is directed to the compressor $CS_2$. The liquid fraction coming from the second separator $S_2$ located downstream from B is mixed with ethylene coming from C and fed to the pump $CS_1$, whilst the gas fraction, optionally supplemented by injection of hydrogen, is fed at least partially to the compressor $CS_2$, cooled by means of the condenser D and injected into the zones $R_2$ and $R_3$, the complement being passed to an injector placed between $R_3$ and $S_1$ by means of the pipe represented by the broken line.

The presence of the condensers D and E is not indispensable; thus, if the fluid leaving B is at 0° C under 40 bars, it is, after adiabatic compression, at 70° C under 1,000 bars or at 85° C under 1,500 bars, and these temperatures are sufficiently low to avoid the post-polymerisation reactions which can take place with the catalyst residues; equally, if the fluid issuing from B is at −30° C under 20 bars, it is, after adiabatic compression, at 15° C under 1,000 bars or at 25° C under 1,500 bars.

In general terms, the invention thus relates to a process for the polymerisation of ethylene, in the presence of hydrogen, at a temperature of 180° to 340° C under a pressure of 200 to 2,500 bars by means of a catalyst system of the Ziegler type, in at least one stirred reactor comprising at least one first reaction zone and at least one second reaction zone, wherein the reaction mixture is fed to a separator under a pressure of 80 to 400 bars, characterized in that at least a part of the gas mixture coming from the separator is partially liquified at a temperature of −50° to +20° C to allow the polymerisation of ethylene in two zones at different hydrogen concentrations. The ethylene compressed by $CS_1$ therefore constitutes from 25 to 200% of the ethylene compressed by $CS_2$. The process of the invention can be combined with the process described in French Pat. No. 2,313,399, according to which ethylene is injected between the reactor and the separator at a pressure below that of the separator; in that case, the said injected ethylene is advantageously made available between the separator $S_2$ and the compressor $CS_2$.

The process of the invention can also be combined with the process described in French Pat. No. 2,302,305, wherein, at the end of the reaction, at least one alkali metal salt or alkaline earth metal salt of a carboxylic acid, which has been selected in order that its reaction products with the catalyst components remain in the polymer, is injected in the pure state or diluted with a hydrocarbon, into the reaction mixture.

Though it is of more limited interest, the polymerisation flow-sheet which has just been described can also be applied to a radical mechanism process in which the ethylene is polymerised by means of initiators such as peroxides or peresters. In this case it contributes to the production of low-density polyethylene in contrast to the process according to the invention which makes it possible to prepare a polyethylene of high density, which is usually between 0.960 and 0.970 g/cm³.

It is obvious that it does not go outside the scope of the invention to make minor modifications to the process described.

The object of the examples which follow is to illustrate the invention without thereby implying a limitation.

EXAMPLES 1 to 5

The polymerisation is carried out in an installation according to the FIGURE. The autoclave reactor is of cylindrical shape, internally fitted with metal screens which define the three reaction zones of identical volume. Each zone is equipped with a catalyst injector, an ethylene injector and two thermocouples. The residence time of the catalyst system in the whole of the reactor varies from 25 to 60 seconds, depending on the examples.

The catalyst system employed is a violet titanium trichloride $TiCl_3.\frac{1}{3} AlCl_3$ preactivated with a suspension of trioctyl-aluminium in methyl-cyclohexane, up to an atomic ratio (Al/Ti) = 1, subjected to prepolymerisation with 1-hexene, using a molar ratio (1-hexene/Ti) of 3 to 5, and finally activated with trioctyl-aluminium up to the final atomic ratio (Al/Ti) = 3. The catalyst suspension is injected into the zones $R_1$ and $R_2$.

The polymerisation is carried out at a pressure of 1,500 bars and only the zones $R_1$ and $R_2$ are fed with gas mixture. Examples 1 and 3 are given by way of comparison; the whole recycled ethylene is fed without cooling in B, either to the compressor $CS_1$ (Example 1) or to the compressor $CS_2$ (Example 3) according to British Pat. No. 1,419,012. Table I below summarizes the experimental conditions, in particular, for each zone, its temperature T° C, its part $\phi\%$ of the total feed flow and its proportion by volume, $h\%$, of hydrogen; the table also indicates the temperature $T_S$° C and the pressure Ps (in bars) at which the separation is effected in B.

Table II below summarizes the polymerisation results, including the catalyst yield in kilograms of polymer per milliatom of titanium, the melt index MI measured in dg/10 min. according to Standard Specification ASTM 1238 - 62T, the density $\zeta$ of the polyethylene, expressed in g/cm³ and measured at 20° C on samples which have been re-heated for one hour at 150° C and then cooled at a speed of 50° C/hour, the polydispersity index (Mw/Mn) defined above, the proportion by weight, b, of polymer of molecular weight less than 5,000, the percentage elongation at break EB and the tensile strength TS in kg/cm², both measured according to Standard Specification ISO R 527, and the modulus of elasticity ME in kg/cm² measured under bending conditions, in accordance with Standard Specification ASTM D 790-71.

These results show that for the same catalyst yield and the same density, the partial liquefaction by means of the condenser B makes it possible to decrease the melt index and increase the polydispersity index. Simultaneously, the fraction of low polymers decreases, resulting in an improvement in the mechanical properties under tensile and bending conditions.

EXAMPLES 6 and 7

The polymerisation is carried out at a pressure of 1,200 bars in an installation according to the FIGURE by means of a catalyst suspension identical to that of the preceding examples. The reaction zones $R_1$, $R_2$ and $R_3$, respectively, functioning at temperatures of 215°, 250° and 260° C are respectively fed with 50%, 40% and 10% of the total flow of ethylene. Hydrogen in a proportion by volume of $h\%$ relative to ethylene, and propane in a proportion by weight of $\pi\%$ relative to ethylene are admixed to the feed ethylene. The other experimental conditions, expressed in terms of the same symbols as in the preceding examples, are summarized in Table III below. Example 6, in which the whole recycled ethylene is fed to the compressor $CS_1$ without cooling in B, is given by way of comparison.

Table IV below summarizes the polymerisation results expressed in terms of the same symbols as in the preceding examples. They show the same possibility brought about by the process of the invention, to make resins having a low melt index, a high polydispersity index and improved mechanical properties.

TABLE I

| Ex. | $\phi_1$ | $h_1$ | $T_1$ | $\phi_2$ | $h_2$ | $T_2$ | $T_3$ | $T_s$ | $P_s$ |
|---|---|---|---|---|---|---|---|---|---|
| 1 | 50 | 0.3 | 225 | 50 | 0.3 | 250 | 260 | — | — |
| 2 | 40 | 0.1 | 225 | 60 | 0.3 | 250 | 260 | 0 | 40 |
| 3 | 20 | 0.1 | 225 | 80 | 0.3 | 250 | 260 | — | — |
| 4 | 50 | 0.1 | 225 | 50 | 0.3 | 250 | 260 | −30 | 20 |
| 5 | 50 | 0.2 | 230 | 50 | 0.3 | 255 | 260 | −30 | 20 |

TABLE II

| Ex. | Catalyst Yield | MI | $\rho$ | $\dfrac{M_w}{M_n}$ | b | EB | TS | ME |
|---|---|---|---|---|---|---|---|---|
| 1 | 5.2 | 0.9 | 0.961 | 8.9 | 8.2 | 700 | 310 | 7000 |
| 2 | 5.1 | 0.4 | 0.960 | 14.8 | 6.3 | 800 | 330 | 7300 |
| 3 | 5.1 | 0.6 | 0.958 | 11.4 | 7.1 | 700 | 320 | 7700 |
| 4 | 5.3 | 0.25 | 0.958 | 15.5 | 5.0 | 900 | 370 | 7200 |
| 5 | 5.4 | 2.2 | 0.962 | 8.0 | 9.0 | 500 | 290 | 8000 |

TABLE III

| Ex. | $h_1$ | $\pi_1$ | $h_2$ | $\pi_2$ | $h_3$ | $\pi_3$ | $T_s$ | $P_s$ |
|---|---|---|---|---|---|---|---|---|
| 6 | 0.3 | 5 | 0.3 | 5 | 0.3 | 5 | — | — |
| 7 | 0.1 | 8 | 0.3 | 3 | 0.3 | 3 | −30 | 20 |

TABLE IV

| Ex. | Catalyst Yield | MI | $\rho$ | $\dfrac{M_w}{M_n}$ | b | EB | TS | ME |
|---|---|---|---|---|---|---|---|---|
| 6 | 4.5 | 0.8 | 0.966 | 9.3 | 6.8 | 700 | 310 | 8200 |
| 7 | 4.6 | 0.3 | 0.968 | 15.2 | 5.4 | 800 | 350 | 8800 |

We claim:

1. In a process for the polymerisation of a reaction mixture comprising ethylene, in the presence of hydrogen, at a temperature of 180° to 340° C under a pressure of 1,000 to 2,500 bars in the presence of a catalyst in at least one stirred reactor comprising at least one first reaction zone and at least one second reaction zone, which process comprises releasing the pressure and passing the reaction mixture to a first separator under a pressure of 80 to 400 bars to form a gas phase and a liquid phase, passing the liquid phase coming from the first separator to a first funnel under a pressure of 1 to 15 bars to form a polymer and a gas phase, recovering the polymer coming from the first funnel, and recompressing the gas phase coming from the first funnel and passing it to the first reaction zone, the improvement comprising passing the gas phase coming from the first separator to a second funnel via a first condenser to form a liquid phase and a gas phase, recovering the liquid phase from the second funnel, partially liquifying at least a part of the gas phase coming from the second funnel at a temperature of −50 to +20° C by means of a second condenser, releasing the pressure to a value of 10 to 60 bars and separating the flow from the second condenser in a second separator to form a liquid and a gas phase, recompressing the gas phase coming from the second separator and passing the recompressed gas phase from the second separator to the second reaction zone, mixing the liquid phase coming from the second separator with the gas phase coming from the first funnel, recompressing said mixture of liquid phase and gas phase, and passing said recompressed mixture to the first reaction zone.

2. Process according to claim 1, further comprising injecting hydrogen into the gas phase coming from the second separator before it is recompressed.

3. Process according to claim 1, wherein said ethylene is polymerised in the presence of 1 to 20% by weight of an inert hydrocarbon.

4. Process according to claim 1, wherein said ethylene is copolymerised with a member selected from the group consisting of an α-olefine and a non-conjugated diolefine.

5. Process according to claim 1, further comprising injecting ethylene between the reactor and the first separator, at a pressure below that of the first separator.

6. Process according to claim 5, wherein the injected ethylene is obtained from the gas phase coming from the second separator.

7. Process according to claim 1, further comprising, at the end of the reaction, injecting into the reaction mixture at least one member selected from the group consisting of alkali metal salts and alkaline earth metal salts of a carboxylic acid, said member being selected in order that its reaction products with the catalyst components remain in the polymer.

8. Process according to claim 7, wherein said injected member is injected in the pure state.

9. Process according to claim 7, wherein said injected member is diluted with a hydrocarbon prior to being injected.

10. Process according to claim 1, wherein the recompressed mixture passed to the first reaction zone constitutes from 25 to 200% by weight of the gas phase passed to the second reaction zone.

11. A process according to claim 1, wherein said catalyst is a catalyst system of the Ziegler type comprising a halogen compound of a transition metal and an organo-aluminum activator.

12. A process according to claim 1, wherein said catalyst is a peroxide or perester initiator.

* * * * *